(12) United States Patent
Hong et al.

(10) Patent No.: US 10,297,816 B2
(45) Date of Patent: May 21, 2019

(54) LITHIUM SECONDARY BATTERY HAVING IMPROVED SAFETY AND STABILITY

(75) Inventors: Ji-Jun Hong, Seong (KR); Sung-Tae Ko, Chungcheongnam-do (KR); Yoon-Jeong Heo, Chungcheongnam-do (KR)

(73) Assignee: Kokam Co., Ltd., Siheung-si, Gyeonggi-do (KR)

( * ) Notice: Subject to any disclaimer, the term of this patent is extended or adjusted under 35 U.S.C. 154(b) by 0 days.

(21) Appl. No.: 14/361,176

(22) PCT Filed: Feb. 9, 2012

(86) PCT No.: PCT/KR2012/000963
§ 371 (c)(1),
(2), (4) Date: Apr. 6, 2015

(87) PCT Pub. No.: WO2013/081245
PCT Pub. Date: Jun. 6, 2013

(65) Prior Publication Data
US 2016/0164078 A1    Jun. 9, 2016

(30) Foreign Application Priority Data
Nov. 30, 2011 (KR) .................. 10-2011-0127330

(51) Int. Cl.
*H01M 4/36* (2006.01)
*H01M 10/05* (2010.01)
*H01M 4/13* (2010.01)
*H01M 4/52* (2010.01)
*H01M 4/50* (2010.01)
*H01M 4/62* (2006.01)
(Continued)

(52) U.S. Cl.
CPC .......... *H01M 4/366* (2013.01); *H01M 4/131* (2013.01); *H01M 4/505* (2013.01); *H01M 4/525* (2013.01); *H01M 4/587* (2013.01); *H01M 4/5825* (2013.01); *H01M 4/622* (2013.01); *H01M 4/625* (2013.01); *H01M 10/052* (2013.01); *H01M 10/4235* (2013.01); *H01M 4/38* (2013.01)

(58) Field of Classification Search
CPC ...................................... H01M 4/58
See application file for complete search history.

(56) References Cited

U.S. PATENT DOCUMENTS

2008/0124630 A1    5/2008  Kim et al.
2010/0151326 A1*   6/2010  Jung ............... H01M 4/364
                                                     429/224
(Continued)

FOREIGN PATENT DOCUMENTS

EP    1 087 452 A2    3/2001
EP    2450988 A1      5/2012
(Continued)

*Primary Examiner* — Barbara L Gilliam
*Assistant Examiner* — Nathanael T Zemui
(74) *Attorney, Agent, or Firm* — Kenneth E. Horton; Kirton McConkie

(57) ABSTRACT

Disclosed is an electrode active material including a core formed from one selected from the group consisting of lithium-containing transition metal oxide, a carbon material, a lithium metal, and a metal compound, or mixtures thereof, and a shell formed on a surface of the core and including lithium metal oxide particles and polymer, and a lithium secondary battery using the same.

8 Claims, 7 Drawing Sheets

(51) Int. Cl.
*H01M 4/58* (2010.01)
*H01M 10/42* (2006.01)
*H01M 10/052* (2010.01)
*H01M 4/131* (2010.01)
*H01M 4/505* (2010.01)
*H01M 4/525* (2010.01)
*H01M 4/587* (2010.01)
*H01M 4/38* (2006.01)

(56) References Cited

U.S. PATENT DOCUMENTS

| | | | | |
|---|---|---|---|---|
| 2010/0310940 A1* | 12/2010 | Kim | ................ | B82Y 30/00 |
| | | | | 429/231.95 |
| 2011/0052991 A1 | 3/2011 | Kim et al. | | |
| 2011/0129729 A1* | 6/2011 | Kim | ................ | H01M 4/133 |
| | | | | 429/209 |
| 2011/0244322 A1* | 10/2011 | Hong | ................ | H01M 4/364 |
| | | | | 429/211 |
| 2013/0252102 A1* | 9/2013 | Kobayakawa | ........ | H01M 4/622 |
| | | | | 429/217 |
| 2014/0227432 A1* | 8/2014 | Liu | ................ | H01M 4/133 |
| | | | | 427/58 |

FOREIGN PATENT DOCUMENTS

| | | | |
|---|---|---|---|
| JP | 2004-87299 A | 3/2004 | |
| JP | 2010-140901 | 6/2010 | |
| JP | 2011-502332 A | 1/2011 | |
| KR | 10-2007-0016431 | 2/2007 | |
| KR | 10-0888685 | 3/2009 | |
| KR | 10-2010-0127433 | 12/2010 | |
| KR | 10-2011-0023067 | 3/2011 | |
| WO | WO 2010053222 A1 * | 5/2010 | ............. B82Y 30/00 |
| WO | WO 2010064755 A1 * | 6/2010 | ............ H01M 4/364 |
| WO | 2010137753 A1 | 12/2010 | |

* cited by examiner

LITHIUM SECONDARY BATTERY HAVING IMPROVED SAFETY AND STABILITY

TECHNICAL FIELD

The present disclosure relates to an electrode active material with improved safety and stability and a lithium secondary battery using the same. More particularly, the present disclosure relates to an electrode active material with improved safety and stability, which has a shell including lithium metal oxide particles and polymer, and a lithium secondary battery using the same.

The present application claims priority to Korean Patent Application No. 10-2011-0127330 filed in the Republic of Korea on Nov. 30, 2011, the disclosures of which are incorporated herein by reference.

BACKGROUND ART

A lithium secondary battery has a structure in which an assembly is composed of a cathode and an anode including an electrode active material coated on a current collector, the electrode active material being capable of intercalating and deintercalating lithium ions, with a porous separator interposed between the cathode and the anode to electrically separate them, and the assembly is filled with an organic electrolyte solution or polymer electrolyte solution containing a lithium salt.

As a cathode active material, lithium metal oxide having a high average voltage (for example, $LiCoO_2$, $LiNiO_2$, $LiNi_xCo_yAl_zO_2$, $LiNi_xCo_yMn_zO_2$, and $LiMn_2O_4$) is mainly used, and as an anode active material, a carbon material or metal or non-metal oxide having a low average potential is primarily used.

In the case where a cathode active material is used without a post-processing process, that is, in the case where a commercially available active material produced without surface treatment and treatment processes is used, a transition metal-deficient layer is formed on the surface of the active material due to a decomposition reaction between an electrolyte solution and a metal, and the transition metal-deficient layer or a resistor film on the surface of the active material impedes movement of lithium ions and electrons, affecting high efficient discharge, and due to a side reaction with an electrolyte solution, gas is generated inside a battery and a metal is released, as a result, deterioration in cycling characteristics occurs due to a structural change. Also, as a battery operates abnormally, internal temperature of the battery increases and oxygen is generated, which features poor safety, inducing a thermal runaway phenomenon.

In the case where a carbon-based anode active material is used, an irreversible capacity exhibiting in lithium ions intercalated within a layered structure during initial charging and discharging is 5 to 25%, and this irreversible capacity promotes consumption of lithium ions and prevents complete charging or discharging of a minimum of one active material or more, which features a reduced energy density of a battery.

Also, a decomposition reaction of an electrolyte solution on the surface of an active material causes the formation of a passivating layer or a solid electrolyte interface on the surface of the active material, and in this instance, when the passivating layer is formed non-uniformly or thickly, an increase in resistance causes deterioration in high rate characteristics. Also, as a lithium compound is generated on the surface of an anode, a capacity reduction and output characteristics degradation results from lithium loss, and in the long run, deterioration in cycling characteristics occurs.

DISCLOSURE

Technical Problem

The present disclosure is designed to solve the problem of the related art, and therefore, it is an object of the present disclosure to provide an electrode active material that may improve safety and cycling characteristics by enhancing coating performance and a lithium secondary battery using the same.

Technical Solution

To achieve the above object, according to one aspect of the present disclosure, there is provided an electrode active material including a core formed from one selected from the group consisting of lithium-containing transition metal oxide, a carbon material, a lithium metal, and a metal compound, or mixtures thereof, and a shell formed on a surface of the core and including lithium metal oxide particles and polymer.

The lithium-containing transition metal oxide of the core may be any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \le y<1$), $Li(Ni_aCo_bMn_c)O_4$ ($0<a<2$, $0<b<2$, $0<c<2$, $a+b+c=2$), $LiMn_{2-z}Ni_zO_4$, and $LiMn_{2-z}Co_zO_4$ ($0<z<2$), or mixtures thereof.

The carbon material may be any one selected from the group consisting of soft carbon, hard carbon, natural graphite, Kish graphite, pyrolytic carbon, mesophase pitch based carbon fiber, Mesophase Graphite Powder (MGP), mesocarbon microbeads, Mesophase pitches, petroleum derived cokes, and coal tar derived cokes, or mixtures thereof.

The lithium metal oxide particles may be particles of any one selected from the group consisting of lithium iron phosphate, lithium manganese phosphate, lithium iron manganese phosphate, lithium titanate, and lithium vanadium oxide, or particles of mixtures thereof.

The metal compound may be a compound containing at least one metal element selected from the group consisting of Si, Ge, Sn, Pb, P, Sb, Bi, Al, Ga, In, Ti, Mn, Fe, Co, Ni, Cu, Zn, Ag, Mg, Sr, and Ba, or mixtures thereof.

The shell may include a lithium metal oxide particle layer formed on the core, and a polymer layer coated on a surface of the lithium metal oxide particle layer.

Also, the shell may include a polymer and lithium metal oxide particle layer formed on the core, and a polymer layer coated on a surface of the polymer and lithium metal oxide particle layer.

The polymer may be any one selected from the group consisting of PVdF (poly(vinylidene fluoride)), PVdF-co-HFP(Poly(vinylidene fluoride-co-hexafluoropropene)), PVA (Polyvinyl alcohol), PTF (Polytetrafluoroethylene), SBR (Styrene Butadiene Rubber), PEO (poly(ethylene oxide), PPO (Polypropylene oxide), PAN (Polyacrylonitrile), and PVC(poly(vinyl chloride)), or mixtures thereof.

A content of the lithium metal oxide particles may be in a range of 0.5 to 5.0 parts by weight based on 100 parts by weight of the core.

A content of the polymer may be in a range of 0.1 to 3.0 parts by weight based on 100 parts by weight of the core.

An average particle size of the lithium metal oxide particles may be less than or equal to 1 μm.

The shell may further include metal oxide, conductive carbon, or a mixture thereof.

According to another aspect of the present disclosure, there is provided an electrode for a lithium secondary battery, including an electrode current collector, and an electrode active material layer formed on at least one surface of the electrode current collector and including an electrode active material, wherein the electrode active material is the above-described electrode active material.

According to still another aspect of the present disclosure, there is provided a lithium secondary battery including a cathode, an anode, a separator interposed between the cathode and the anode, and an electrolyte solution, wherein at least one of the cathode and the anode is the above electrode.

Advantageous Effects

According to one aspect of the present disclosure, with a surface-modified electrode active material by introducing a shell including lithium metal oxide particles and polymer, provided is an electrode active material having improved coating performance by controlling an increase in specific surface area and reactivity with moisture that has occurred in conventional physical nanoparticle coating, improved adhesion retention through suppression of volume expansion of the electrode active material, improved cycling characteristics through suppression of reactivity with moisture and a side reaction with an electrolyte solution due to the reduced specific surface area, and improved safety through regulating an amount of heat generated inside, and a lithium secondary battery comprising the same.

MODE FOR DISCLOSURE

Figure 1:
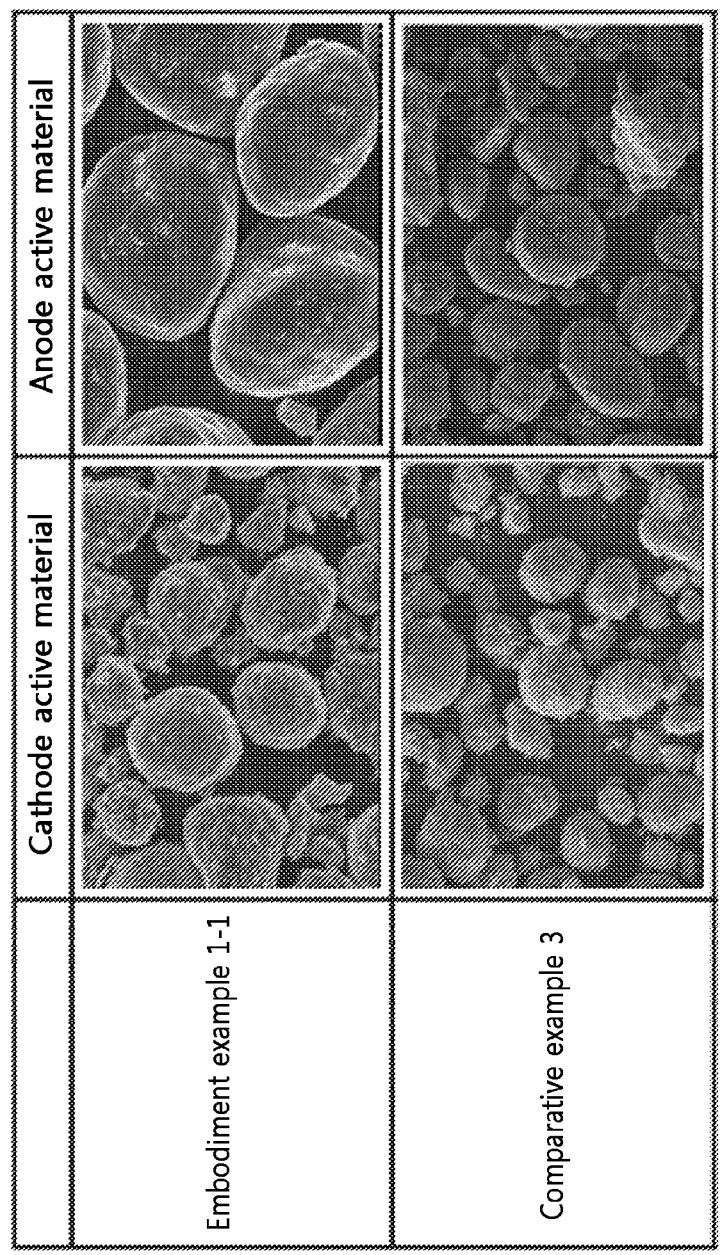
FIG. 1 is a scanning electron microscopy (SEM) image of cathode active materials and anode active materials of Embodiment example 1-1 and Comparative example 3.
Figure 2:
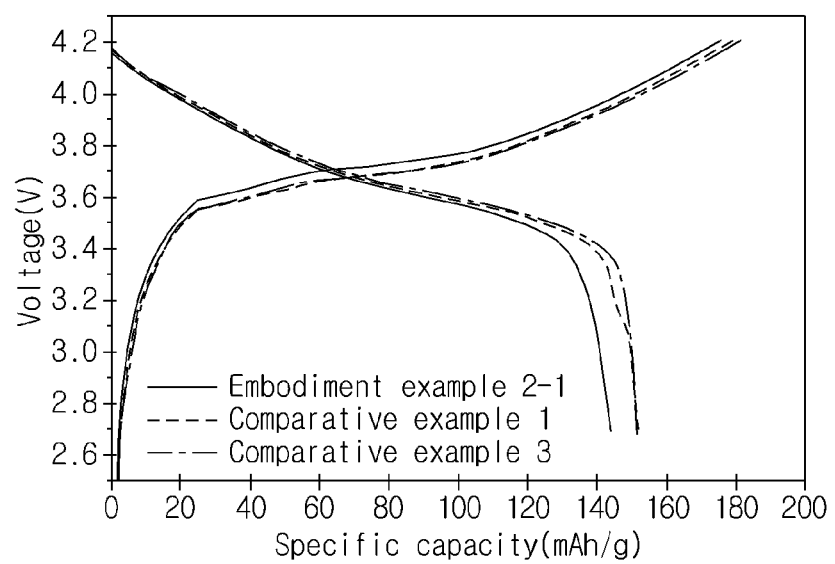
FIG. 2 is an initial charge/discharge graph of lithium secondary batteries fabricated according to Embodiment example 2-1, Comparative example 1, and Comparative example 3.
Figure 3A:
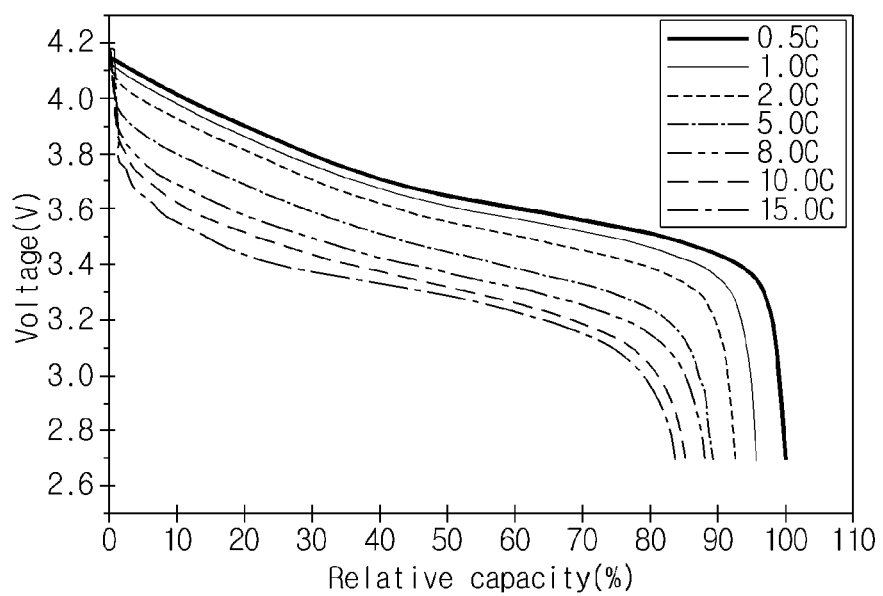
FIG. 3a is a graph showing discharge rate characteristics of a lithium secondary battery fabricated according to Embodiment example 2-1.
Figure 3B:
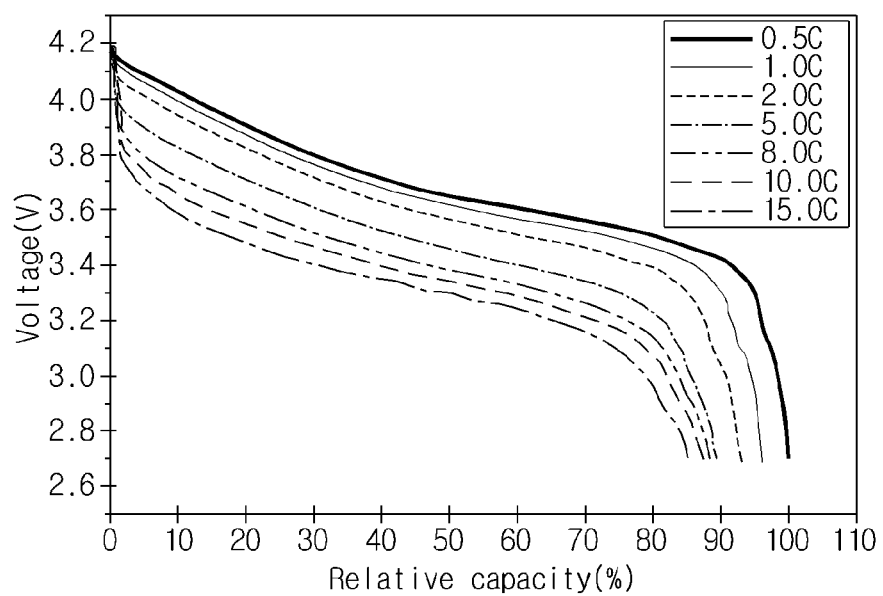
FIG. 3b is a graph showing discharge rate characteristics of a lithium secondary battery fabricated according to Comparative example 1.
Figure 3C:
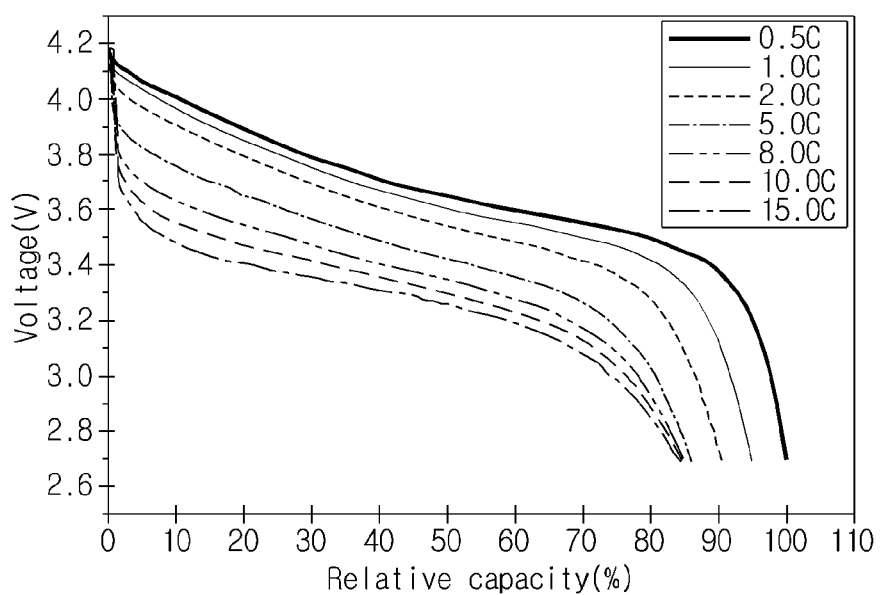
FIG. 3c is a graph showing discharge rate characteristics of a lithium secondary battery fabricated according to Comparative example 3.
Figure 4:
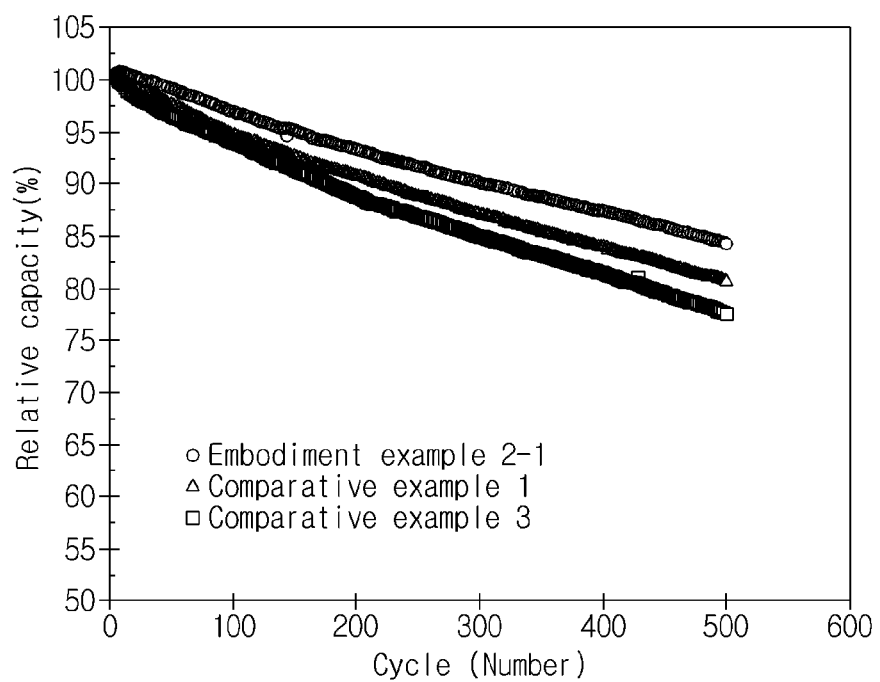
FIG. 4 is a graph showing life characteristics at high temperature for lithium secondary batteries fabricated according to Embodiment example 2-1, Comparative example 1, and Comparative example 3.
Figure 5:
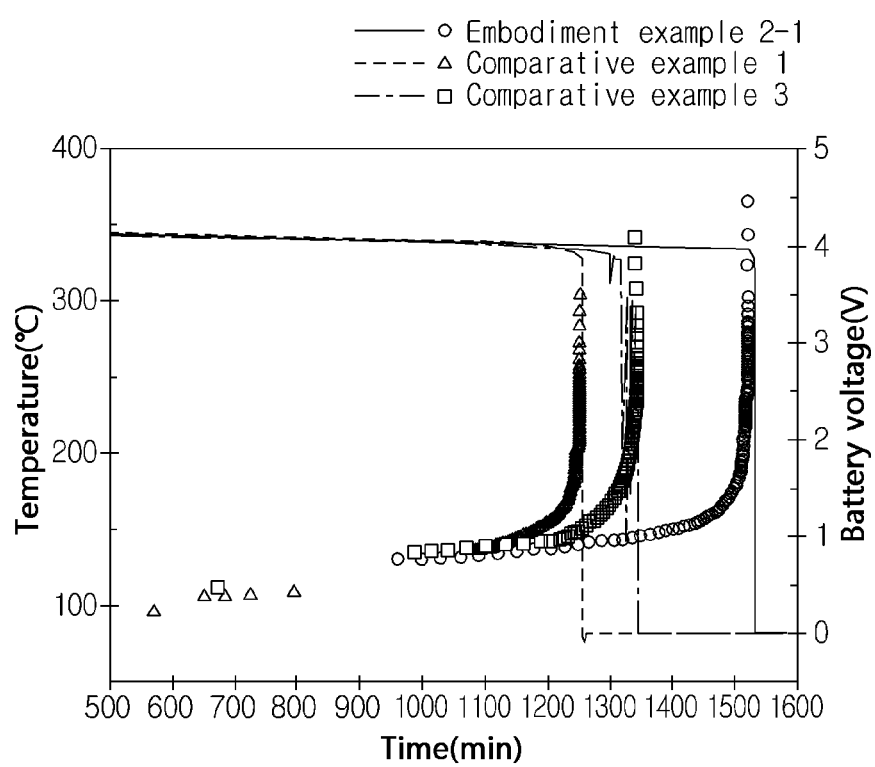
FIG. 5 is a graph showing battery behaviors after a breakdown test based on thermal behavior of lithium secondary batteries fabricated according to Embodiment example 2-1, Comparative example 1, and Comparative example 3.

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

An electrode active material according to one aspect of the present disclosure has a core formed from one selected from the group consisting of lithium-containing transition metal oxide, a carbon material, a lithium metal, and a metal compound, or mixtures thereof, and a shell formed on the surface of the core and including metal oxide particles and polymer.

A conventional electrode active material impedes movement of lithium ions and electrons due to cracking and fragmentation of the electrode active material during repeated charging/discharging cycles or a reaction with an electrolyte solution on the surface of the electrode active material, resulting in deterioration in capacity characteristics and stability and a short cycle life.

Accordingly, according to one aspect of the present disclosure, the above problem is solved by providing an electrode active material having a shell including lithium metal oxide particles and polymer formed on a core made from a conventional electrode active material.

In this instance, the electrode active material may be used as both a cathode active material and an anode active material.

First, let us see the case where the electrode active material according to an exemplary embodiment of the present disclosure is used as a cathode active material.

In the case where the electrode active material is used as a cathode active material, a common cathode active material such as lithium-containing transition metal oxide may be applied to the core.

As a non-limiting example, the lithium-containing transition metal oxide is any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0\leq y<1$), $Li(Ni_aCo_bMn_c)O_4$ ($0<a<2$, $0<b<2$, $0<c<2$, $a+b+c=2$), $LiMn_{2-z}Ni_zO_4$, and $LiMn_{2-z}Co_zO_4$ ($0<z<2$), or mixtures thereof.

An average particle size of the lithium-containing transition metal oxide may be in a range of 6 to 16 μm, but is not limited thereto.

The lithium-containing transition metal oxide may be coated with lithium metal oxide such as lithium iron phosphate, lithium manganese phosphate, and lithium iron manganese phosphate. Also, in addition to the lithium-containing transition metal oxide, sulfide, selenide, and halide may be used.

On the core, a shell including lithium metal oxide particles and polymer is provided.

In this instance, the shell may include a lithium metal oxide particle layer formed on the core, and a polymer layer coated on the surface of the lithium metal oxide particle layer.

Also, the shell may include a polymer and lithium metal oxide particle layer formed on the core, and a polymer layer coated on the surface of the polymer and the lithium metal oxide particle layer.

That is, as the lithium metal oxide particle layer is formed on the surface of the core, a contact with an electrolyte solution is limited and release of metal oxide or lithium ions from the core is limited, and due to thermal and structural stability, stability and safety is improved, and besides, due to coating with polymer on the surface of the lithium metal oxide particles, a volume change of the core made from the common electrode active material is suppressed and adhesion performance at an electrode is improved, thereby improving stability, and furthermore, hydrophobic surface treatment of the electrode active material effectively suppresses adsorption and inflow of moisture from the outside world and prevents a side reaction caused by moisture from occurring in the battery, and moreover, a specific surface area of the electrode active material reduces and consequently, a side reaction with an electrolyte solution reduces, thereby improving safety and stability.

The lithium metal oxide particles may be, for example, particles of any one selected from the group consisting of lithium iron phosphate, lithium manganese phosphate, lithium iron manganese phosphate, lithium titanate, and lithium vanadium oxide, or particles of mixtures thereof, but are not limited thereto.

In the electrode active material according to an exemplary embodiment used as the cathode active material as described in the foregoing, in the presence of lithium metal oxide having an olivine structure, for example, lithium iron phosphate introduced into the shell, a side reaction with an electrolyte solution may be suppressed, and in the case of overcharge and an internal short, a thermal runaway phenomenon caused by overcurrent may be prevented because an amount of lithium migrating from a cathode to an anode is limited, as a consequence, an amount of lithium deposited on an anode reduces and an amount of heat generation resulting from a reaction with an electrolyte solution reduces.

Next, let us see the case where the electrode active material according to an exemplary embodiment is used as an anode active material.

In the case where the electrode active material is used as an anode active material, a common anode active material allowing intercalation/deintercalation of lithium ions such as a carbon material, a lithium metal, a metal compound, or mixtures thereof, may be applied to the core.

As the carbon material, both low crystalline carbon and high crystalline carbon may be used. As the low crystalline carbon, soft carbon and hard carbon are typical examples, and as the high crystalline carbon, high temperature sintered carbon such as natural graphite, Kish graphite, pyrolytic carbon, mesophase pitch based carbon fiber, Mesophase Graphite Powder (MGP), meso-carbon microbeads, Mesophase pitches, petroleum derived cokes, and coal tar derived cokes is a typical example.

The metal compound may represent a compound containing at least one metal element such as Si, Ge, Sn, Pb, P, Sb, Bi, Al, Ga, In, Ti, Mn, Fe, Co, Ni, Cu, Zn, Ag, Mg, Sr, and Ba. These metal compounds may be used in any type, for example, pure metals, alloys, oxides ($TiO_2$, $SnO_2$, and the like), nitrides, sulfides, borides, alloys with lithium, but pure metals, alloys, oxides, and alloys with lithium may lead to a high capacity. Among them, a metal compound that may contain at least one element selected from Si, Ge, and Sn and includes at least one element selected from Si and Sn may contribute to a higher capacity of a battery.

An average particle size of the carbon material, the lithium metal, and the metal compound may be in a range of 15 to 30 μm, but is not limited thereto.

Also, a shell including lithium metal oxide particles and polymer is provided on the core.

The lithium metal oxide particles may be, for example, particles of any one selected from the group consisting of lithium iron phosphate, lithium manganese phosphate, lithium iron manganese phosphate, lithium titanate, and lithium vanadium oxide, or particles of mixtures thereof, but are not limited thereto.

The electrode active material according to an exemplary embodiment of the present disclosure used as the anode active material as described in the foregoing introduces, into the shell, the lithium metal oxide particles having a spinel structure such as lithium titanium oxide, and as a result, the lithium metal oxide particles may prevent a solid electrolyte interface (SEI) layer of an excessively high thickness from being formed on the surface of an anode and control a thermal runaway hazard as well, thereby improving electrochemical characteristics intrinsic to an existing lithium secondary battery as well as safety.

The lithium metal oxide particles introduced into the shell of the electrode active material according to an exemplary embodiment of the present disclosure that may be applicable as any one of the cathode active material and the anode active material may have an average particle size, for example, less than or equal to 1 μm, or in a range of 10 nm to 1 μm, or in a range of 100 nm to 800 nm.

When the average particle size of the lithium metal oxide particles satisfies the above range, efficiency of an applied dry coating process in the present disclosure may be maximized. When the average particle size is greater than 1 μm, it is not preferred because efficiency and reproducibility of a surface coating process for the core reduces, and in the case where the lithium metal oxide particles do not get involved in coating and some exists as different types of metal oxides in a simply mixed state, the lithium metal oxide particles behave at a different potential, which makes it difficult to use, and they may be present as a resistor. Also, when the average particle size is less than 10 nm, to increase coating performance, addition of a large amount of metal oxides is needed, causing a cost increase.

Also, the content of the lithium metal oxide particles may be, for example, in a range of 0.5 to 5.0 parts by weight, or in a range of 1.0 to 3.0 parts by weight, to be exact, in a range of 1.5 to 2.5 parts by weight, based on 100 parts by weight of the core.

When the content of the lithium metal oxide particles satisfies the above range, the lithium metal oxide particles sufficiently surround the surface of the core, thereby producing a coating effect, and in contrast, when the content exceeds the range, residual metal oxide particles after getting involved in coating behave at a different potential and thus may act as a resistor, and when the content is less than the range, the lithium metal oxide particles cannot completely coat the core, and thus there is a limitation in suppressing reactivity with an electrolyte solution, thereby it is difficult to attain the object intended to be achieved by the present disclosure.

The polymer introduced into the shell of the electrode active material according to an exemplary embodiment of the present disclosure may include, without limitation, any binder polymer commonly used in a lithium secondary battery, and use of polymer capable of conducting ions, for example, polymer having a high dielectric constant, is preferred because it may further improve the performance of an electrochemical device. In practice, a rate of dissolution of salts in an electrolyte solution depends on a dielectric constant of the electrolyte solution, and accordingly, the higher dielectric constant of the polymer, the higher conductivity. The dielectric constant of the polymer may be in a range of 1 to 50 (measured at frequency of 1 kHz), particularly, most preferably, higher than or equal to 5.

An available polymer may be, for example, any one selected from the group consisting of PVdF (poly(vinylidene fluoride)), PVA (Polyvinyl alcohol), PVdF-co-HFP (Poly(vinylidene fluoride-co-hexafluoropropene)), PTF (Polytetrafluoroethylene), SBR (Styrene Butadiene Rubber), PEO (poly(ethylene oxide), PPO (Polypropylene oxide), PAN (Polyacrylonitrile), and PVC (poly(vinyl chloride)) or mixtures thereof, but is not limited thereto.

Also, the content of the polymer may be, for example, in a range of 0.1 to 3.0 parts by weight or in a range of 0.3 to 2.0 parts by weight, based on 100 parts by weight of the core.

When the content of the polymer satisfies the above range, coating performance may be improved due to being sufficient to cover the surface of the coating layer as well as enhanced adhesive force between the core and the shell, so effects intended to be produced by the present disclosure may be obtained. When the content is higher than the range, a thick polymer film may be formed on the surface of the coating layer, causing a reduction in electrical conductivity and consequently, reduction in initial cell efficiency and cell performance, and when the content is less than the range, the polymer is insufficient to cover the surface of the coating layer, so nano-sized lithium metal oxide is exposed outside and continuously reacts with moisture, inconveniently, more careful attention should be paid to moisture control in a cell fabrication process, adhesive force between the core and the shell reduces, and in particular, in the case of an anode, it may be inadequate to suppress a cracking phenomenon caused by continuous expansion and shrinkage taking place while cycling is in progress.

Also, to improve coating performance of the shell on the core, metal oxide may be further included in the shell. The metal oxide may be titanium dioxide, aluminum oxide, zirconium oxide, halfnium oxide, or thallium oxide.

Optionally, conductive carbon may be further included in the shell of the electrode active material to improve conductivity. The conductive carbon may be Super-P, Ketjen black, graphite, acetylene black, carbon nanotubes, and activated carbon.

In this instance, the metal oxide and the conductive carbon may be included together.

A detailed description of a method of manufacturing the electrode active material according to one aspect of the present disclosure is as follows.

First, lithium metal oxide particles and polymer may be coated on the surface of particles of one selected from the group consisting of lithium-containing transition metal oxide, a carbon material, a lithium metal, and a metal compound, or particles of mixtures thereof, used to form the core.

Generally, a coating method is classified into a dry coating method and a wet coating method. Conventionally, a wet method has been used for a homogeneous dispersion of a coating material. However, in the wet coating method, there is a limitation in coating in a type of a film, and when preparing a coating liquid, a dispersant is included, and accordingly, a process of removing the dispersant needs to be added and there is a limitation in removing the dispersant.

In contrast, a dry coating method used in the present disclosure coats a coating material corresponding to a shell on the surface of a core active material using a mechanical method, and is a method having high reproducibility and high yield that involves from simple mixing to coating by applying a shearing force, an impact force, and a compression force using equipment designed for coating.

Subsequently, thermal treatment of the polymer is performed on the core forming particles coated with the lithium metal oxide particles and the polymer, and the polymer is treated by heating at temperature higher than or equal to a melting temperature of the polymer under an inert atmosphere, to cause the polymer to be coated on the lithium metal oxide particles.

As a result, a shell including the lithium metal oxide particles and the polymer is formed on the core.

Subsequently, when a step of forming the shell is completed, an electrode active material according to one aspect of the present disclosure may be obtained.

The manufactured electrode active material may be used as a cathode active material or an anode active material.

Also, according to one aspect of the present disclosure, in an electrode of a lithium secondary battery having an electrode current collector and an electrode active material layer formed on at least one surface of the electrode current collector and including an electrode active material, the above electrode active material is provided to an electrode for a lithium secondary battery. In the case where the electrode active material is a cathode active material, the electrode may be constructed as a cathode, and in the case where the electrode active material is an anode active material, may be constructed as an anode.

As the current collector, a metal having high conductivity may be used, and among metals to which a slurry of the active material may be easily bonded, any one that does not have reactivity within a voltage range of a battery may be used. Specifically, a current collector for a cathode may be, as a non-limiting example, a foil made from aluminum, nickel or a combination thereof, and a current collector for an anode may be, as a non-limiting example, a foil made from copper, gold, nickel, or a copper alloy, or combinations thereof. Also, as the current collector, a stack of substrates made from the materials may be used.

The electrode according to one aspect of the present disclosure may be manufactured as a cathode or an anode by a manufacturing method commonly used in the art, and for example, the electrode may be manufactured by a method which prepares an electrode compound by blending using an active material, a conductive material, a binder, and a high boiling point solvent, and then coats the compound on the current collector directly, or coats and dries the electrode compound on a separator support and laminates, on the current collector, a film obtained by peeling off from the separator support. After drying and press forming, the manufactured electrode may be completed by heat processing under a vacuum for at least two hours in a temperature range of 80 to 130° C.

According to one aspect of the present disclosure, using the manufactured cathode or anode, a lithium secondary battery including a separator interposed between the cathode and the anode and an electrolyte solution may be provided.

That is, a lithium secondary battery according to one aspect of the present disclosure may include a cathode and an anode using the above cathode active material and the above anode active material, respectively, or may include a cathode using only the above cathode active material and an anode using a common anode active material, or may include a cathode using a common cathode active material and an anode using the above anode active material.

Specifically, when the electrode active material according to one aspect of the present disclosure is used as a cathode active material, generally, a carbon material, a lithium metal, silicon, or tin that allows intercalation/deintercalation of lithium ions may be used as an anode active material, and metal oxide having a potential below 2.5V for lithium, for example, $TiO_2$ and $SnO_2$, may be used.

In this instance, as the carbon material, both low crystalline carbon and high crystalline carbon may be used. As the low crystalline carbon, soft carbon and hard carbon are typical examples, and as the high crystalline carbon, high temperature sintered carbon such as natural graphite, Kish graphite, pyrolytic carbon, mesophase pitch based carbon fiber, Mesophase Graphite Powder (MGP), meso-carbon microbeads, Mesophase pitches, petroleum derived cokes, and coal tar derived cokes is a typical example.

In this instance, the anode may include a binder, and as the binder, various types of binder polymers may be used, for example, PVdF-co-HFP, polyvinylidenefluoride, polyacrylonitrile, polymethylmethacrylate, and the like.

Also, when the electrode active material according to one aspect of the present disclosure is used as an anode active material, lithium-containing transition metal oxide may be used as a cathode active material. In this instance, the lithium-containing transition metal oxide may be, for example, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2(0 \leq y<1)$, $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4(0<z<2)$, $LiCoPO_4$, and $LiFePO_4$, or mixtures thereof. Also, in addition to oxide, sulfide, selenide, and halide may be used.

In the electrolyte solution used in the lithium secondary battery according to one aspect of the present disclosure, a lithium salt that may be included as an electrolyte may include, without limitation, those commonly used in an electrolyte solution for a lithium secondary battery, and for example, as an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

An organic solvent included in the electrolyte solution may include, without limitation, those commonly used in an electrolyte solution for a lithium secondary battery, and as a typical example, may be any one selected from the group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulforane, gamma-butyrolactone, propylene sulfide and tetrahydrofuran, or mixtures thereof. Particularly, among the carbonate-based organic solvents, cyclic carbonate such as ethylene carbonate and propylene carbonate corresponds to an organic solvent having a high viscosity, and is preferred to use because it dissociates a lithium salt in an electrolyte well due to its high dielectric constant, and when mixed, at a proper ratio, with linear carbonate having a low viscosity and a low dielectric constant such as dimethyl carbonate and diethyl carbonate, such cyclic carbonate is more preferred to use because it contributes to form an electrolyte solution having high electrical conductivity.

Optionally, the electrolyte solution may further include an additive, such as an overcharge inhibitor, used in a general electrolyte solution.

Also, as the separator, a general porous polymer film used as a separator in the art may be employed, for example, a porous polymer film made from a polyolefin-based polymer such as an ethylene homopolymer, a propylene homopolymer, an ethylene/propylene copolymer, an ethylene/butene copolymer, an ethylene/hexene copolymer, and an ethylene/methacrylate copolymer, arranged singularly or in a stack, or a general porous non-woven fabric, for example, a non-woven fabric made from a glass fiber having a high melting point, a polyethyleneterephthalate fiber, and the like, however the present disclosure is not limited thereto.

A battery case used in the lithium secondary battery according to one aspect of the present disclosure may employ those commonly used in the art, and is not limited to a specific outer shape based on the purpose of use of a battery, and the battery case may have, for example, a circular shape using a can, a prismatic shape, a pouch shape, a coin shape, and the like.

Hereinafter, a detailed description will be provided through embodiment examples to specify the present disclosure. However, it should be understood that embodiments according to the present disclosure may be modified in various forms and the scope of the present disclosure is not limited to the following embodiment. The embodiments of the present disclosure are provided to describe the present disclosure more thoroughly to those skilled in the art.

<Manufacture of Electrode Active Material>

EMBODIMENT EXAMPLE 1-1

100 parts by weight of lithium composite oxide ($LiNi_xCo_yMn_zO_2$) as a core forming material, 1.5 parts by weight of $LiFePO_4$ having an average particle size of about 800 nm as a shell forming material, 0.3 parts by weight of Super-P as conductive carbon, and 0.5 parts by weight of PVdF as polymer were prepared, and by a method of dry coating and thermal treatment for them, a cathode active material made of a core-shell lithium metal oxide was manufactured.

100 parts by weight of Mesophase Graphite Powder (MGP) as a core forming material, 2.0 parts by weight of $Li_4Ti_5O_{12}$ having an average particle size of about 800 nm as a shell forming material, 0.5 parts by weight of Super-P, and 1.0 part by weight of PVdF were prepared, and by a method of dry coating and thermal treatment for them, an anode active material made of a core-shell carbide was manufactured.

In this instance, the dry coating was performed using dry coating equipment (NOB™, Hosokawa Micron Ltd., Japan) as coating equipment. Within the coating equipment, not only the previously prepared core forming material and shell forming material but also 0.1 parts by weight of $TiO_2$ as nano metal oxide for improving coating performance were mixed and processed at a rotation rate of 2,500 rpm for three minutes. Subsequent thermal treatment was carried out at 250° C. under a nitrogen atmosphere for one hour, to manufacture a core-shell electrode active material.

EMBODIMENT EXAMPLE 1-2

A cathode active material and an anode active material were manufactured by the same method as Embodiment example 1-1 except only dry coating was performed instead of the method of dry coating and thermal treatment.

EMBODIMENT EXAMPLE 1-3

A cathode active material was manufactured by the same method as Embodiment example 1-1 except 2.0 parts by weight of $LiFePO_4$ as a shell forming material, 0.3 parts by weight of Super-P, 0.1 parts by weight of $TiO_2$, and 1.0 part by weight of PVdF were used, and an anode active material was manufactured by the same method as Embodiment example 1-1.

EMBODIMENT EXAMPLE 1-4

A cathode active material and an anode active material were manufactured by the same method as Embodiment example 1-3 except only dry coating was performed instead of the method of dry coating and thermal treatment, and an anode active material was manufactured by the same method as Embodiment example 1-1.

EMBODIMENT EXAMPLE 1-5

An anode active material was manufactured by the same method as Embodiment example 1-1 except only dry coating was performed instead of the method of dry coating and thermal treatment, and a cathode active material was manufactured by the same method as Embodiment example 1-1.

EMBODIMENT EXAMPLE 1-6

An anode active material was manufactured by the same method as Embodiment example 1-1 except 2.0 parts by weight of $Li_4Ti_5O_{12}$ as a shell forming material, 0.5 parts by weight of Super-P, 0.1 parts by weight of $TiO_2$, and 2.0 parts by weight of PVdF were used, and a cathode active material was manufactured by the same method as Embodiment example 1-1.

<Fabrication of Lithium Secondary Battery>

EMBODIMENT EXAMPLE 2-1

The cathode active material obtained from Embodiment example 1-1, conductive carbon for providing conductivity, and polyvinylidenfluoride (PVdF) as a binder were put at a weight ratio of 93/3/4, and N-methyl pyrrolidone (NMP) was mixed therewith, to prepare a slurry having viscosity less than or equal to 3500 cPa (25° C.), and the slurry was coated on an aluminum foil, followed by drying and rolling, to obtain a cathode.

The anode active material obtained from Embodiment example 1-1, conductive carbon for providing conductivity, and polyvinylidenfluoride (PVdF) as a binder were put at a weight ratio of 85/8/7, and N-methyl pyrrolidone (NMP) was mixed therewith, to prepare a slurry having viscosity less than or equal to 3500 cPa (25° C.), and the slurry was coated on a copper foil, followed by drying and rolling, to obtain an anode.

After interposing a polyolefin porous sheet between the obtained cathode and the obtained anode, an aluminum outer case was applied, and a non-aqueous electrolyte solution in which $LiPF_6$ was dissolved at a concentration of 1.15 M in a non-aqueous solvent of a mixture of ethylene carbonate and ethyl methyl carbonate at a volume ratio of 1:3 was injected, to fabricate a lithium secondary battery. For electrical characteristics test, the battery was fabricated with a standard size of 10 mm (thickness)×216 mm (width)×216 mm (length) and a design capacity of 40 Ah, and for thermal safety test, was fabricated with a standard size of 60 mm (thickness)×34 mm (width)×59 mm (length) and a design capacity of 0.9 Ah.

EMBODIMENT EXAMPLE 2-2

A lithium secondary battery was fabricated by the same method of Embodiment example of 2-1 except a cathode and an anode were manufactured using the cathode active material and the anode active material obtained from Embodiment example 1-2, respectively.

EMBODIMENT EXAMPLE 2-3

A lithium secondary battery was fabricated by the same method of Embodiment example of 2-1 except a cathode and an anode were manufactured using the cathode active material and the anode active material obtained from Embodiment example 1-3, respectively.

EMBODIMENT EXAMPLE 2-4

A lithium secondary battery was fabricated by the same method of Embodiment example of 2-1 except a cathode and an anode were manufactured using the cathode active material and the anode active material obtained from Embodiment example 1-4, respectively.

EMBODIMENT EXAMPLE 2-5

A lithium secondary battery was fabricated by the same method of Embodiment example of 2-1 except a cathode and an anode were manufactured using the cathode active material and the anode active material obtained from Embodiment example 1-5, respectively.

EMBODIMENT EXAMPLE 2-6

A lithium secondary battery was fabricated by the same method of Embodiment example of 2-1 except a cathode and an anode were manufactured using the cathode active material and the anode active material obtained from Embodiment example 1-6, respectively.

COMPARATIVE EXAMPLE 1

A lithium secondary battery was fabricated by the same method of Embodiment example of 2-1 except a cathode was manufactured using $LiNi_xCo_yMn_zO_2$ solely as a core forming material and an anode was manufactured using Mesophase Graphite Powder (MGP) solely as an anode active material.

COMPARATIVE EXAMPLE 2

A cathode active material and an anode active material were respectively manufactured by the same method as Embodiment example 1-1 except, in the cathode active material, 100 parts by weight of $LiNi_xCo_yMn_zO_2$ as a core forming material and 0.5 parts by weight of PVdF as a shell forming material were used, and in the anode active material, 100 parts by weight of Mesophase Graphite Powder (MGP) as a core forming material and 1.0 part by weight of PVdF as a shell forming material were used.

A lithium secondary battery was fabricated by the same method of Embodiment example of 2-1 except the cathode active material and the anode active material obtained in this way were used.

COMPARATIVE EXAMPLE 3

A cathode active material and an anode active material were respectively manufactured by the same method as Embodiment example 1-1 except, in the cathode active material, 100 parts by weight of $LiNi_xCo_yMn_zO_2$ as a core forming material, 2.0 parts by weight of $LiFePO_4$ as a shell forming material and 0.3 parts by weight of Super-P were used, and in the anode active material, 100 parts by weight of Mesophase Graphite Powder (MGP) as a core forming material, 2.0 part by weight of $Li_4Ti_5O_{12}$ as a shell forming material and 0.5 parts by weight of Super-P were used, and except a thermal treatment process.

A lithium secondary battery was fabricated by the same method of Embodiment example of 2-1 except the cathode active material and the anode active material obtained in this way were used.

Evaluation of Characteristics

1. Specific Surface Area Characteristics The cathode active material and the anode active material manufactured in Embodiment example 1-1 and used in Comparative examples 1 and 3 were measured for a specific surface area using a BET measuring machine (Micromeritics, TriStar II 3020), and their results are shown in the following Table 1.

TABLE 1

|  | Embodiment example 1-1 | Comparative example 1 | Comparative example 3 |
| --- | --- | --- | --- |
| Cathode active material | 0.7704 m²/g | 0.4179 m²/g | 0.9959 m²/g |
| Anode active material | 2.7984 m²/g | 1.1084 m²/g | 3.8162 m²/g |

Referring to the above Table 1, when compared to the active material of Comparative example 1 having no shell without undergoing surface treatment, the surface coated active materials of Embodiment example 1-1 and Comparative example 3 have a wider specific surface area. However, it can be seen that Embodiment example 1-1 coated with polymer such as PVdF together is lower in a specific surface area than Comparative example 3 simply coated with only nano metal oxide.

It is similar to an active surface material surface state result shown in FIG. 1 obtained using scanning electron microscope (SEM) to test surface characteristics of an electrode active material, and this is attributed to a remarkable reduction in reaction between nano metal oxide surface coated by coating with PVdF, that is, polymer and the outside world.

2. Electrochemical Characteristics

For the lithium secondary batteries fabricated according to Embodiment examples 2-1 through 2-6 and Comparative examples 1 through 3, tests were conducted on an initial specific capacity, initial efficiency, discharge characteristics, cycling characteristics at high temperature and long-term storage at high temperature using a charge/discharge cycling device, and their results are shown in Tables 2 and 3 and FIGS. 2, 3a through 3c, and 4.

In this instance, for test of initial efficiency and initial specific capacity, after initial charging at 25° C. under the CC-CV (Constant current-Constant voltage) condition of a charging voltage of 4.2V and a current density of 8 A, followed by a rest period for ten minutes, discharging was performed with a discharging current of 20 A up to 3.0V.

Also, for discharge characteristics vs current density, after charging at 25° C. under the CC-CV condition of a charging current of 20 A and a charging voltage of 4.2V, followed by a rest period for ten minutes, discharging was performed with a discharging current in a range of 0.5 C to 15.0 C up to 2.7V, and subsequently, a ratio of a discharge capacity at a current density of 15.0 C relative to a discharge capacity at a current density of 0.5 C (20 A) as a reference capacity was organized and presented.

TABLE 2

|  | Initial specific capacity [mAh/g] | Initial efficiency [%] | 15.0 C discharge characteristics (vs. 0.5 C) [%] |
| --- | --- | --- | --- |
| Embodiment example 2-1 | 148.6 | 81.3 | 84.3 |
| Embodiment example 2-2 | 148.2 | 82.0 | 57.7 |
| Embodiment example 2-3 | 141.3 | 81.7 | 81.1 |
| Embodiment example 2-4 | 146.8 | 81.3 | 44.7 |
| Embodiment example 2-5 | 147.9 | 81.2 | 71.7 |
| Embodiment example 2-6 | 144.8 | 80.7 | 81.2 |
| Comparative example 1 | 151.4 | 83.5 | 84.0 |
| Comparative example 2 | 147.5 | 81.7 | 38.6 |
| Comparative example 3 | 151.9 | 84.3 | 85.5 |

Referring to the initial specific capacity shown in the above Table 2, Embodiment examples 2-1 through 2-6 using a cathode active material and an anode active material each having a shell show slightly lower capacity characteristics. However, because an inflection phenomenon at the end of discharging that has been recognized as being found due to non-uniform coating was mitigated, it is considered coating performance may be ensured.

Also, when comparing high rate discharge characteristics shown in Table 2, it can be seen that particularly, Embodiment examples 2-1, 2-3 and 2-6 using a cathode active material and an anode active material manufactured by performing thermal treatment after coating the surface of a core with a shell show improvement in high rate discharge characteristics.

Also, in Table 3, a discharge efficiency at a $500^{th}$ cycle is presented, after initial charging at 60° C. under the CC-CV (Constant current-Constant voltage) condition of a charging voltage of 4.2V and a current density of 40 A using a charge/discharge cycling device, followed by a rest period for ten minutes, and discharging with a discharging current of 40 A up to 3.0V. In this instance, in the case of Comparative example 1 using an electrode active material without undergoing any surface treatment, life characteristics are found to be lowest, while in the case where active materials with surface treatment by any method were used, life characteristics are found to be higher.

Also, when comparing characteristics with or without thermal treatment after surface coating with polymer, it is indeed considered that dissimilar to simple mixing, thermal treatment performed on nano-sized lithium metal oxide particles coated on the surface of a core suppresses a decomposition reaction of an electrolyte solution on the surface of the active material thereby further improving charge/discharge cycling characteristics of a battery.

A capacity after left at 60° C. for one month was measured by a method of checking an initial capacity using a charge/discharge cycling device, and each capacity efficiency when discharged at 25° C. with 40 A up to 3.0V without any charging condition is shown in Table 3. It also can be seen that in the case of Comparative example 1, a self-discharge rate is highest, whereas in Embodiment examples and Comparative examples 2 and 3, a deterioration phenomenon is delayed by suppressing a decomposition reaction with an electrolyte solution through surface treatment. Also, in case in which thermal treatment is not performed, nano-sized lithium metal oxide present on the surface of an electrode active material has a violent reaction with an electrolyte solution, as a consequence, due to a decomposition reaction and an exhaustion phenomenon of an electrolyte solution storage characteristics of a battery show a feature that degrades to a certain extent.

TABLE 3

|  | Efficiency at 500th cycle | Capacity after left at 60° C. for one month |
|---|---|---|
| Embodiment example 2-1 | 84.3% | 93.7% |
| Embodiment example 2-2 | 81.5% | 90.7% |
| Embodiment example 2-3 | 82.9% | 92.9% |
| Embodiment example 2-4 | 80.0% | 91.1% |
| Embodiment example 2-5 | 79.4% | 90.6% |
| Embodiment example 2-6 | 82.5% | 93.0% |
| Comparative example 1 | 77.6% | 82.0% |
| Comparative example 2 | 82.1% | 91.1% |
| Comparative example 3 | 80.8% | 89.9% |

Referring to the above Table 3, it is found that the lithium secondary batteries of Embodiment examples 2-1 through 2-6 reduce a decomposition reaction with an electrolyte solution during high temperature cycling characteristics because they have electrodes of surface-treated cathode and anode active materials, and this is considered as a result of surface coating with PVdF and thermal treatment to inhibit lithium nano metal oxide from directly reacting with an electrolyte solution.

Also, it is found that characteristics are further improved by mitigating a conventional adhesion decrease phenomenon occurred due to volume expansion of an anode, by suppressing a composition reaction of an electrolyte solution and volume expansion of an anode active material caused by moisture which may be generated from cathode and anode active materials having a wide specific surface area.

Also, for test of battery safety, temperature and enthalpy of a decomposition reaction with an electrolyte solution was measured using an accelerating rate calorimetry (ARC) to assess thermal safety of the batteries fabricated with surface treatment of an active material according to Embodiment example 2-1, Comparative example 1, and Comparative example 3, and their results are shown in Tables 4 and 5.

TABLE 4

|  | Reaction start temperature [° C.] | Enthalpy [J] | Reaction heat [J/g] |
|---|---|---|---|
| Embodiment example 2-1 | 136.5 | 4685 | 212.2 |
| Comparative example 1 | 96.5 | 6274 | 277.4 |
| Comparative example 3 | 111.5 | 5205 | 236.8 |

As shown in the above Table 4, it can be seen that Comparative example 3 surface-treated with nano metal oxide shows improvement in comparison to Comparative example 1 having undergone no treatment on the surface of an active material, but it can be seen that Embodiment example 2-1 treated with PVdF together is even better than Comparative example 3 simply surface-treated with only nano metal oxide.

That is, generally, because a direct reaction with an electrolyte solution does not take place when a surface-treated active material is used, characteristics are improved in terms of electrical performance and long-term cycles, and it can be clearly seen that a reaction between the surface of an active material and the outside world or a decomposition reaction with an electrolyte solution is minimized by alleviating an increase in specific surface area caused by surface treatment with polymer, and enhancing adhesion maintenance by suppressing volume expansion of an anode active material is effective in improving high temperature cycling or stability.

What is claimed is:

1. A lithium secondary battery, comprising:
   a cathode, an anode, a separator interposed between the cathode and the anode, and an electrolyte solution,
   wherein the cathode comprises:
      an electrode current collector; and
      an electrode active material layer formed on at least one surface of the electrode current collector and comprising an electrode active material, a conductive material, and a binder,
   wherein the electrode active material comprises:
      a core formed from a lithium-containing transition metal oxide, and
      a shell formed on a surface of the core and comprising lithium metal oxide particles, a polymer, and conductive carbon,
      wherein the dielectric constant of the polymer may be in a range of 1 to 50, and, wherein a content of the polymer is in a range of 0.1 to 3.0 parts by weight based on 100 parts by weight of the core,
      wherein the shell comprises a lithium metal oxide particle layer formed on the core, and a polymer layer coated on a surface of the lithium metal oxide particle layer,
      wherein the polymer is any one selected from the group consisting of PVdF (poly(vinylidene fluoride)), PVdF-co-HFP (Poly(vinylidene fluoride-co-hexafluoropropene)), PVA (Polyvinyl alcohol), and PVC (poly(vinyl chloride)), or mixtures thereof; and
   wherein the anode comprises:
      an electrode current collector; and
      an electrode active material layer formed on at least one surface of the electrode current collector, and comprising an electrode active material, a conductive material, and a binder,
   wherein the electrode active material comprises:
      a core formed from one selected from the group consisting of a carbon material, a lithium metal, and a metal compound, or mixtures thereof, and
      a shell formed on a surface of the core and comprising lithium metal oxide particles, a polymer, and conductive carbon,
      wherein the dielectric constant of the polymer may be in a range of 1 to 50, and, wherein a content of the polymer is in a range of 0.1 to 3.0 parts by weight based on 100 parts by weight of the core,
      wherein the shell comprises a lithium metal oxide particle layer formed on the core, and a polymer layer coated on a surface of the lithium metal oxide particle layer, and
      wherein the polymer is any one selected from the group consisting of PVdF (poly(vinylidene fluoride)), PVdF-co-HFP (Poly(vinylidene fluoride-co-hexafluoropropene)), PVA (Polyvinyl alcohol), and PVC (poly(vinyl chloride)), or mixtures thereof.

2. The lithium secondary battery of claim 1, wherein the lithium-containing transition metal oxide of the core is any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \leq y<1$), $Li(Ni_aCo_bMn_c)O_4$ ($0<a<2$, $0<b<2$, $0<c<2$, $a+b+c=2$), $LiMn_{2-z}Ni_zO_4$, and $LiMn_{2-z}Co_zO_4$ ($0<z<2$), or mixtures thereof.

3. The lithium secondary battery of claim 1, wherein the carbon material is any one selected from the group consisting of soft carbon, hard carbon, natural graphite, Kish graphite, pyrolytic carbon, mesophase pitch based carbon fiber, Mesophase Graphite Powder (MGP), meso-carbon microbeads, Mesophase pitches, petroleum derived cokes, and coal tar derived cokes, or mixtures thereof.

4. The lithium secondary battery of claim 1, wherein the lithium metal oxide particles are particles of any one selected from the group consisting of lithium iron phosphate, lithium manganese phosphate, lithium iron manganese phosphate, lithium titanate, and lithium vanadium oxide , or particles of mixtures thereof.

5. The lithium secondary battery of claim 1, wherein the metal compound is a compound containing at least one metal element selected from the group consisting of Si, Ge, Sn, Pb, P, Sb, Bi, Al, Ga, In, Ti, Mn, Fe, Co, Ni, Cu, Zn, Ag, Mg, Sr, and Ba, or mixtures thereof.

6. The lithium secondary battery of claim 1, wherein an average particle size of the lithium metal oxide particles is less than or equal to 1 μm.

7. The lithium secondary battery of claim 1, wherein the shell further comprises metal oxide.

8. The lithium secondary battery of claim 1, wherein the dielectric constant is 5 or more.

\* \* \* \* \*